United States Patent Office 2,992,067
Patented July 11, 1961

2,992,067
DISSOLUTION OF ZIRCONIUM AND ALLOYS THEREOF
John L. Swanson, Richland, Wash., assignor to the United States of America as represented by the United States Atomic Energy Commission
No Drawing. Filed June 3, 1958, Ser. No. 739,632
2 Claims. (Cl. 23—14.5)

This invention relates to the dissolution of metals. In more detail the invention relates to the dissolution of metals such as zirconium, hafnium, and titanium, and their alloys. One alloy which is at present extremely important in the atomic energy field and to which the invention relates is Zircalloy-2, an alloy of zirconium containing 1.5 wt. percent tin, 0.15 wt. percent iron, 0.10 wt. percent chromium, and 0.05 wt. percent nickel in addition to zirconium.

Dissolution of these metals and alloys finds particular application in the atomic energy field wherein it is important both in recovery of metal scrap and in processing spent fuel and blanket elements for nuclear reactors.

It is accordingly an object of my invention to develop a method of dissolving metals.

It is another object of my invention to develop a method of processing nuclear reactor fuel and blanket elements.

It is a detailed object of my invention to develop a method for removing the cladding from nuclear reactor fuel and blanket elements.

These and other objects of my invention are attained in general by dissolving the aforesaid metals in a solution containing ammonium fluoride and ammonium nitrate.

It has been found that these metals go readily into solution in a bath consisting of a mixture of ammonium fluoride and ammonium nitrate and that little of the very explosive gas, hydrogen, is formed by the reaction. The dissolution rate differs for various metals, and also depends on the temperature and the concentrations of the reactants and products. Temperatures ranging between room temperature and boiling may be used depending on the desired effect.

A bath consisting of a mixture of ammonium fluoride and ammonium nitrate offers a convenient means for stripping the cladding from a fuel or blanket element for a nuclear reactor. The fuel or blanket element is immersed in a bath comprising a solution of ammonium fluoride and ammonium nitrate. The concentration of the reactants and the temperature of the bath are selected to obtain the rate of dissolution desired. Contact of the fuel or blanket element with the bath is discontinued when substantially all of the cladding is dissolved.

Some of the core material will likewise be attacked by the bath before the cladding is dissolved. Since the core material is attacked at a much slower rate than is the cladding, comparatively little of the core material is affected by the bath before the cladding is dissolved. Uranium and plutonium fluorides are formed as a result of the action of the bath on the core material. These fluorides are quite insoluble, particularly when the cladding solution is cooled. Most of the uranium and plutonium may therefore be separated from the cladding solution by filtration or centrifugation following cooling of the solution. The cladding solution may then be discarded with loss of fuel material being within acceptable limits. The recovered uranium and plutonium may be added to the remainder of the fuel or blanket material for dissolution in another solution of ammonium fluoride and ammonium nitrate. Also nitric acid may be used to dissolve the fuel or blanket material in accordance with conventional practice.

During the dissolution of these metals in ammonium fluoride solution, two moles of hydrogen are evolved for each mole of metal dissolved, thus requiring special precautions in handling potentially explosive gaseous mixtures. It has been found, however, that addition of the ammonium nitrate to the ammonium fluoride results in a markedly lower amount of hydrogen produced, thus greatly reducing if not eliminating the hazard due to the explosive nature of hydrogen mixtures.

In the following table are given experimentally determined values of the volume of nonbasic gas evolved during the dissolution of zirconium in boiling ammonium fluoride-ammonium nitrate solutions.

*Table*

| Dissolving Medium | | M Zr in Final Solution | Volume Nonbasic Gas Evolved [1] (ml.) |
|---|---|---|---|
| M $NH_4F$ | M $NH_4NO_3$ | | |
| 6.0 | --------- | 0.87 | 4,700 |
| 6.0 | 0.10 | 0.90 | 3,700 |
| 6.0 | 0.25 | 0.84 | 1,700 |
| 6.0 | 0.33 | 0.86 | 1,100 |
| 6.0 | 0.50 | 0.94 | 160 |
| 6.0 | 1.0 | 0.86 | 100 |

[1] Measured by water displacement after passage through hydrochloric acid.

It is apparent that a substantial reduction in the amount of nonbasic, water-insoluble gas evolved was achieved by the addition of ammonium nitrate to the ammonium fluoride. The use of a solution containing one-half mole of ammonium nitrate per mole of zirconium dissolved reduced the amount of gas evolved to a few percent of the amount evolved using ammonium fluoride alone.

Since gases other than hydrogen fall into the category of nonbasic, water-insoluble gases, the above data gives only upper limits for the actual quantities evolved. Most of the gas is, however, hydrogen.

A particular problem exists in processing zirconium scrap. The scrap absorbs sufficient oxygen and nitrogen to increase its hardness considerably and ingots produced therefrom are so hard as to be unsuitable for fabrication. By the use of this method the oxide-nitride surface of zirconium and Zircalloy scrap can be removed and the treated scrap is pure enough to be remelted into usable ingots.

Likewise a particular problem exists in the dissolution of zirconium-tin alloys such as Zircalloy-2 with ammonium fluoride solution alone. The tin content of the alloy is not dissolved by the solution and remains as a finely divided solid. In decladding operations it is desirable that the tin be removed along with the cladding because it might interfere with subsequent processing of the fuel. It is possible to carry out decladding steps employing mixed ammonium fluoride-ammonium nitrate solutions in such a manner that the tin is dissolved along with the zirconium and is completely removed in the jacket waste solution. For optimum operation of the process to obtain low waste losses and waste volumes, it may be necessary to employ conditions such that the tin is not completely dissolved. However a considerable portion of the tin is dissolved and may be removed in the jacket waste solution thus reducing the possibility of interference with subsequent processing. After the cladding is removed the fuel can be dissolved in a conventional manner with nitric acid or it can be dissolved in a fresh mixture of ammonium fluoride and nitrate.

It will be understood that this invention is not to be limited to the details given herein, but that it may be modified within the scope of the appended claims.

What is claimed is:

1. A method of processing a spent fuel element for a nuclear reactor comprising uranium clad in a metal selected from the group consisting of zirconium and alloys consisting predominantly of zirconium comprising immersing the fuel element in a bath consisting of a solution of ammonium fluoride and ammonium nitrate, removing the bath from contact with the fuel element when substantially all the cladding for the fuel element is dissolved, cooling the bath, separating the insoluble uranium and plutonium fluorides formed by attack of the bath on the fuel material of the fuel element from the bath, discarding the bath, and dissolving the fuel material and the uranium and plutonium fluorides recovered from the bath.

2. A method of dissolving a metal selected from the group consisting of zirconium and alloys thereof consisting predominantly of zirconium comprising immersing the metal in a bath consisting of a water solution of ammonium fluoride and ammonium nitrate and removing a water solution containing soluble zirconium values from the bath.

References Cited in the file of this patent

AEC Document TID 7534, Book 1, pages 244–261, "Symposium on the Reprocessing of Irradiated Fuels," held at Brussels, Belgium, May 20–25, 1957.

AEC Document HW 52,000, pages 25–28, Sept. 20, 1957.

Shuler et al.: Document D.P.–283, pages 4–9, April 1955.